United States Patent
Kaneta et al.

(10) Patent No.: US 11,327,597 B2
(45) Date of Patent: May 10, 2022

(54) ROTATING ELECTRIC MACHINE UNIT

(71) Applicant: HONDA MOTOR CO., LTD., Tokyo (JP)

(72) Inventors: Kazuya Kaneta, Saitama (JP); Masato Kawano, Saitama (JP); Takuya Fujimori, Saitama (JP); Masashi Yokoi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 16/852,971

(22) Filed: Apr. 20, 2020

(65) Prior Publication Data

US 2020/0356208 A1 Nov. 12, 2020

(30) Foreign Application Priority Data

May 9, 2019 (JP) .............................. JP2019-089099

(51) Int. Cl.
*H02K 5/04* (2006.01)
*G06F 3/041* (2006.01)
(Continued)

(52) U.S. Cl.
CPC ............ *G06F 3/0416* (2013.01); *G06F 3/044* (2013.01); *G06F 3/0412* (2013.01); *H02K 5/04* (2013.01); *H02K 5/22* (2013.01); *H02K 2203/09* (2013.01)

(58) Field of Classification Search
CPC .... H02K 2213/09; H02K 15/105; H02K 5/00; H02K 5/02; H02K 5/04; H02K 5/124;
(Continued)

(56) References Cited

U.S. PATENT DOCUMENTS

| 7,977,830 B2 * | 7/2011 | Yoshida ................. H02K 5/225 310/58 |
| 8,875,825 B2 * | 11/2014 | Asakura ................... H02K 9/19 310/52 |
| 11,139,720 B2 * | 10/2021 | Yamaguchi .............. H02K 5/20 |

FOREIGN PATENT DOCUMENTS

| JP | 3235950 B2 | 12/2001 |
| JP | 2004-120910 A | 4/2004 |

(Continued)

OTHER PUBLICATIONS

Jan. 19, 2021, Japanese Office Action issued for related JP Application No. 2019-089099.

*Primary Examiner* — Quyen P Leung
*Assistant Examiner* — Leda T Pham
(74) *Attorney, Agent, or Firm* — Paratus Law Group, PLLC

(57) ABSTRACT

A rotating electric machine unit includes a first rotating electric machine, a second rotating electric machine, and a case having a case main body and a case cover. The first rotating electric machine and the second rotating electric machine each includes a stator core, a multi-phase coil attached to the stator core, and a power distribution member connecting the multi-phase coil. The case cover includes a first bulging portion facing the coil end of the first rotating electric machine, and a third bulging portion facing the coil end of the second rotating electric machine. The third bulging portion is positioned closer to a case main body side than the first bulging portion, and at least a part of a wiring connected to the first rotating electric machine is arranged along a surface of the third bulging portion.

4 Claims, 4 Drawing Sheets

(51) Int. Cl.
*G06F 3/044* (2006.01)
*H02K 5/22* (2006.01)
(58) Field of Classification Search
CPC .......... H02K 5/22; H02K 5/225; H02K 27/02;
H02K 3/50; G06F 3/0412; G06F 3/0416;
G06F 3/044; B60K 6/26; B60K 6/405;
B60K 6/40
See application file for complete search history.

(56) References Cited

FOREIGN PATENT DOCUMENTS

| | | |
|---|---|---|
| JP | 4162460 B2 | 10/2008 |
| JP | 2009-262858 A | 11/2009 |
| JP | 2014-093879 A | 5/2014 |
| JP | 2015-023672 A | 2/2015 |
| JP | 2016-052229 A | 4/2016 |

* cited by examiner

കുറച്ച്...

ROTATING ELECTRIC MACHINE UNIT

CROSS-REFERENCE TO RELATED APPLICATIONS

This application is based on and claims priority under 35 USC 119 from Japanese Patent Application No. 2019-089099 filed on May 9, 2019.

TECHNICAL FIELD

The present invention relates to a rotating electric machine unit mounted on an electric vehicle or the like.

BACKGROUND ART

Conventionally, a rotating electric machine unit is mounted as a drive source on an electric vehicle or the like. For example, JP-A-2015-023672 discloses a rotating electric machine in which a neutral point forming conductor and a U-phase (V-phase, W-phase) connection portion that connects U-phase (V-phase, W-phase) coils, as a power distribution member, are arranged on a surface of a coil end as viewed from an axial direction.

In a general rotating electric machine, various sensor devices such as a resolver for detecting a rotor position and a temperature sensor are arranged, and wirings such as signal lines from these sensor devices are drawn out to the outside from the inside of a case and connected to a control device.

In the rotating electric machine of JP-A-2015-023672, the power distribution member is arranged on a surface of the coil end as viewed from the axial direction. When the power distribution member is routed on the surface of the case, an axial length of a case cover increases, and there is room for improvement with regard to this point.

SUMMARY OF INVENTION

An aspect of the present invention provides a rotating electric machine unit capable of suppressing overhang of a wiring and reducing an axial dimension.

An embodiment of the present invention relates to a rotating electric machine unit, which includes:
a first rotating electric machine;
a second rotating electric machine including a rotating shaft that is parallel to a rotating shaft of the first rotating electric machine and is offset from the rotating shaft of the first rotating electric machine as viewed from a rotation axis direction; and
a case including a case main body having a bottomed cylindrical shape that accommodates the first rotating electric machine and the second rotating electric machine, and a case cover that seals an opening portion of the case main body formed on one side in the rotation axis direction, in which
the first rotating electric machine and the second rotating electric machine each includes
a stator core,
a multi-phase coil attached to the stator core, and
a power distribution member arranged at a coil end of the multi-phase coil so as to face the case cover, and connecting the multi-phase coil,
the case cover includes
a first bulging portion facing the coil end of the first rotating electric machine, and
a third bulging portion facing the coil end of the second rotating electric machine,
the third bulging portion is positioned closer to a case main body side than the first bulging portion, and
at least a part of a wiring connected to the first rotating electric machine is arranged along a surface of the third bulging portion According to the above embodiment of the present invention, at least a part of the wiring connected to the first rotating electric machine is arranged along the surface of the third bulging portion positioned closer to the case main body side than the first bulging portion, so that the overhang of the wiring can be suppressed. Therefore, the axial dimension of the rotating electric machine unit can be reduced.

DESCRIPTION OF EMBODIMENTS

Figure 1:
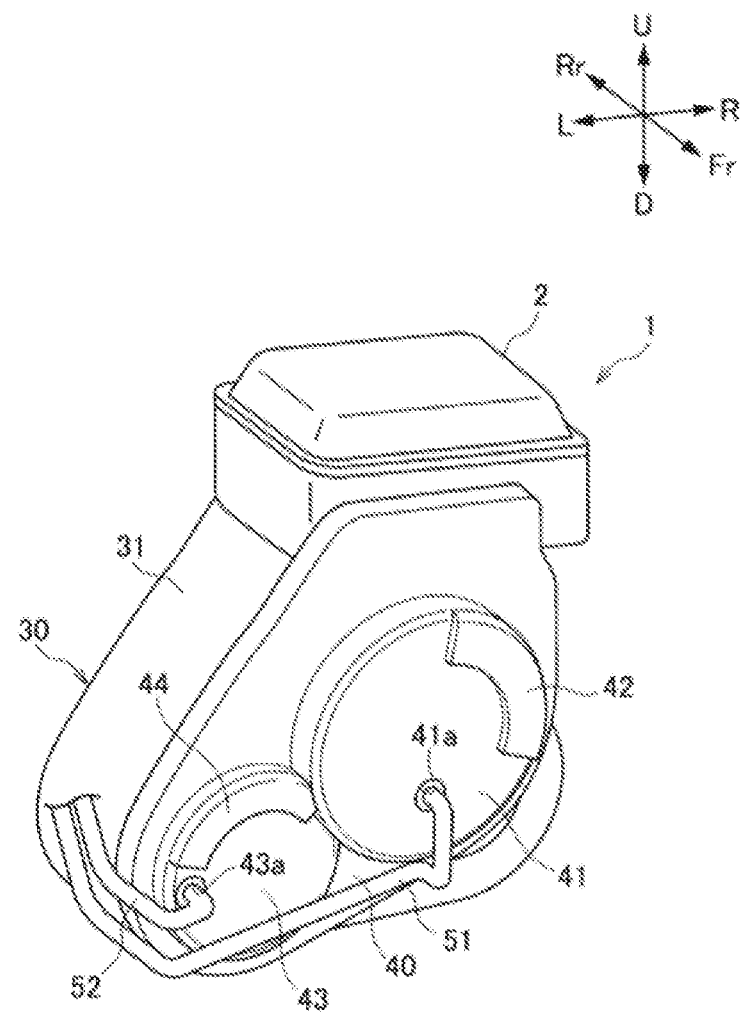
FIG. 1 is a perspective view of a rotating electric machine unit according to an embodiment of the present invention.

Hereinafter, a rotating electric machine unit according to an embodiment of the present invention will be described with reference to FIGS. 1 to 4. In the drawings, reference numerals Fr, Rr, L, R, U, and D show the front, rear, left, right, up, and down, respectively. However, these directions are to simplify the description, and are independent of a front-rear direction of a vehicle or the like on which the rotating electric machine unit is mounted.

Figure 2:
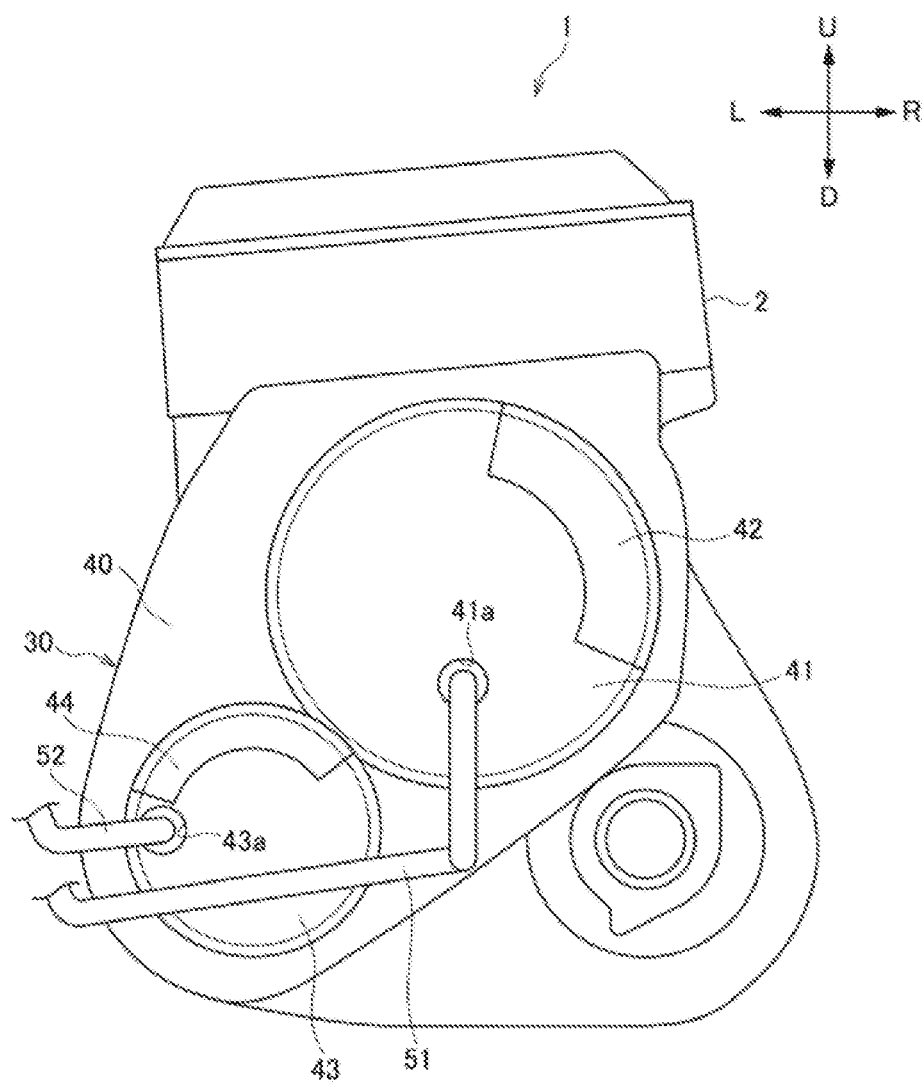
FIG. 2 is a front view of the rotating electric machine unit shown in FIG. 1.

As shown in FIGS. 1 and 2, a rotating electric machine unit 1 is a mechanical and electric integrated rotating electric machine unit on which a power control unit 2 is mounted, and is arranged in an engine room of an electric vehicle or the like, for example.

Figure 3:
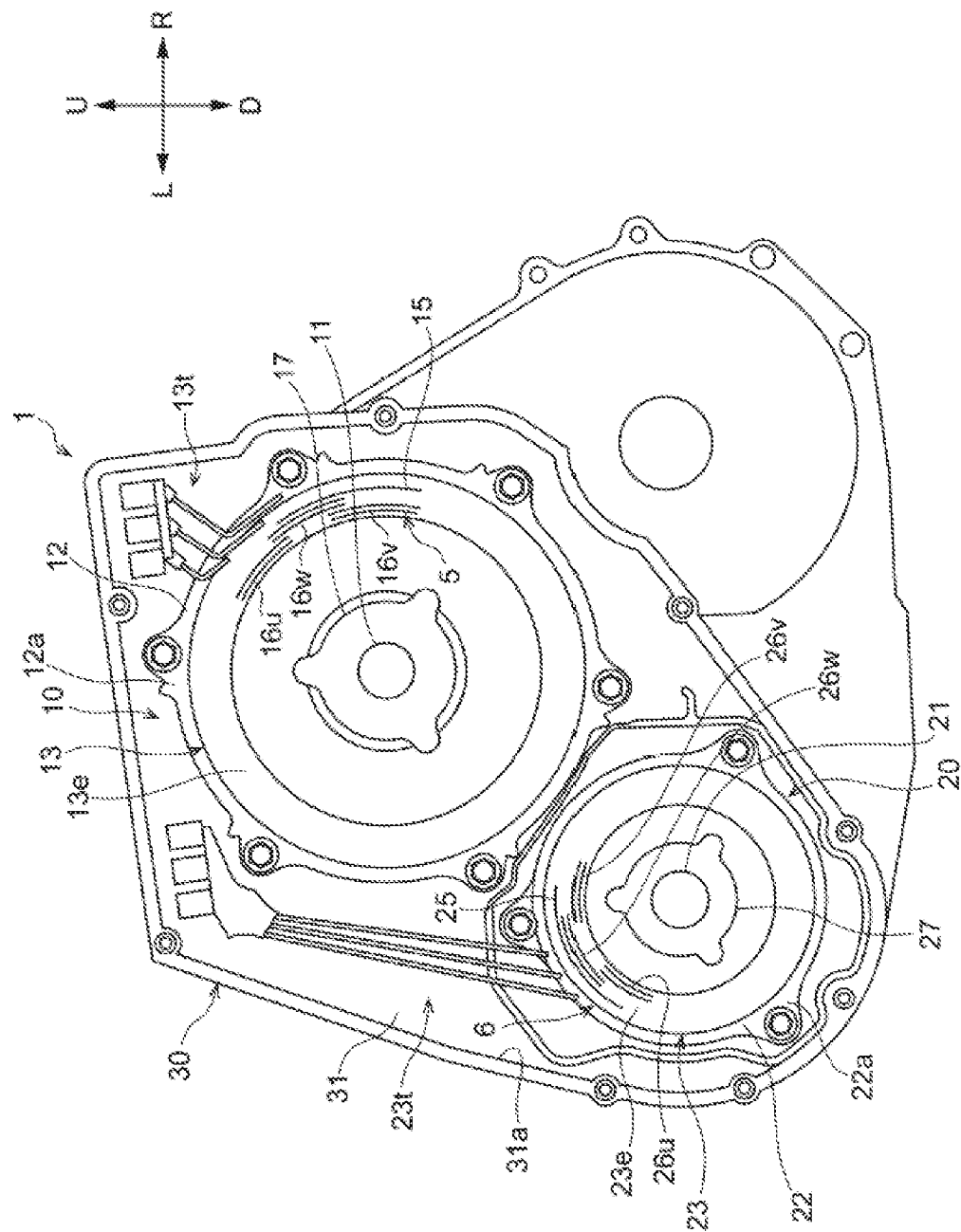
FIG. 3 is a front view of the rotating electric machine unit shown in FIG. 1, whose case cover is removed.

As shown in FIG. 3, the rotating electric machine unit 1 includes a first rotating electric machine 10, a second rotating electric machine 20, and a case 30 that accommodates these.

A rotating shaft 11 of the first rotating electric machine 10 and a rotating shaft 21 of the second rotating electric machine 20 are arranged in parallel with each other, and both extend in a left-right direction. The rotating shafts 11, 21 are arranged to be offset in a front-rear direction and an up-down direction.

As shown in FIG. 1, the case 30 includes a bottomed cylindrical case main body 31 that accommodates the first rotating electric machine 10 and the second rotating electric machine 20, and a case cover 40 that seals one opening portion 31a (see FIG. 3) in an rotation axis direction of the case main body 31. Incidentally, the rotation axis direction (an axial direction) refers to a direction along rotation axes of the rotating shafts 11, 21, and viewing from the rotation axis direction (the axial direction) means viewing from the direction in which the rotation axis is seen as a point.

Figure 4:
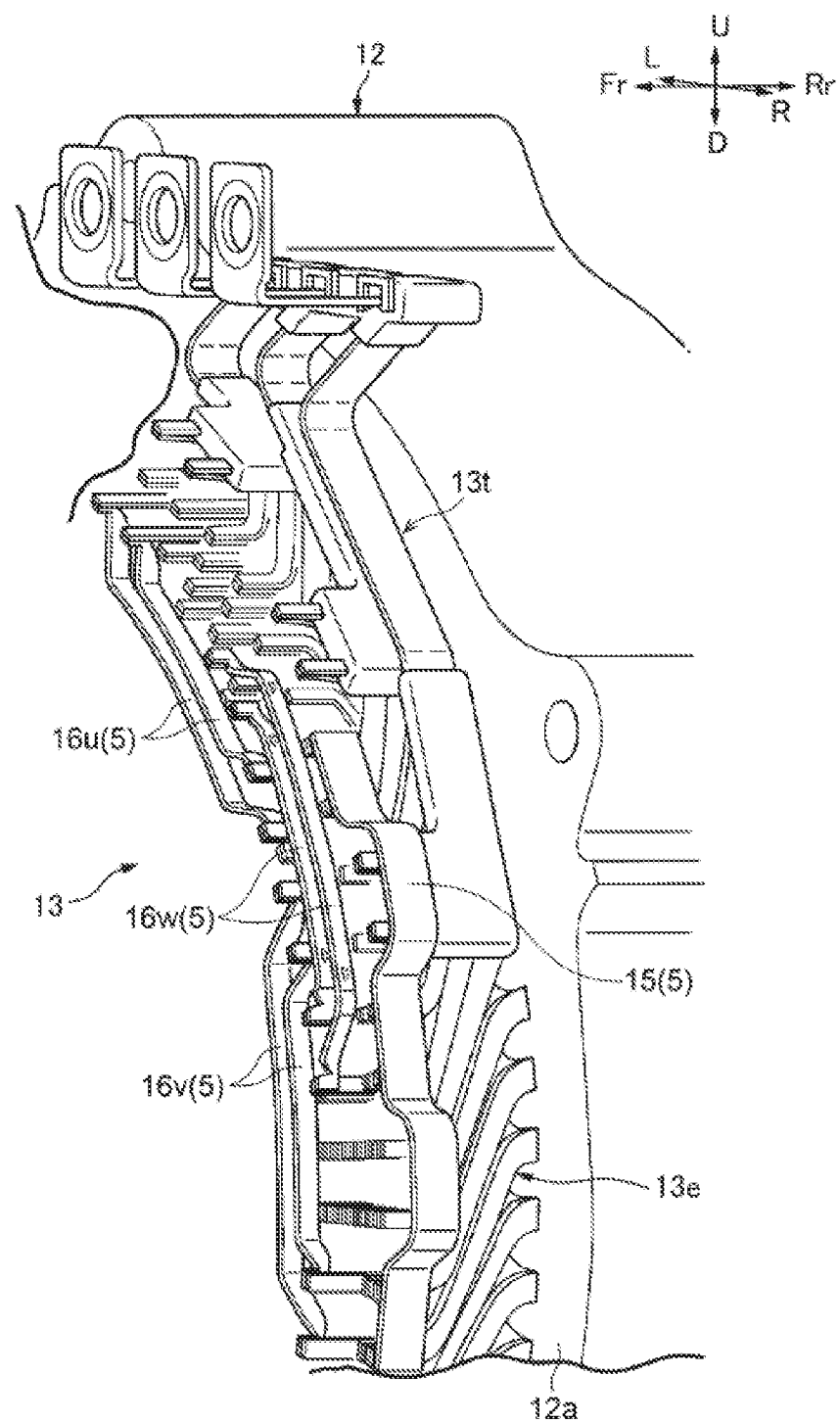
FIG. 4 is a partially enlarged view of a first rotating electric machine of the rotating electric machine unit shown in FIG. 1.

As shown in FIG. 3, the first rotating electric machine 10 includes a stator core 12 and a multi-phase (in the present embodiment, three phases of a U-phase, a V-phase, and a W-phase) coil 13 attached to the stator core 12, and a coil end 13e of the multi-phase coil 13 protrudes from one end surface 12a of the stator core 12 so as to face the case cover 40. Referring also to FIG. 4, the coil 13 includes a U-phase coil, a V-phase coil, and a W-phase coil, and the coil end 13e is provided with a first neutral point bus bar 15 for connecting the U-phase coil, the V-phase coil, and the W-phase coil as a first power distribution member 5 so as to face the case cover 40. In addition, in a vicinity of the first neutral point bus bar 15, a first U-phase connection bus bar 16U for connecting U-phase coils, a first V-phase connection bus bar 16V for connecting V-phase coils, and a first NV-phase connection bus bar 16W for connecting W-phase coils are also provided similarly as the first power distribution member 5. These first power distribution members 5 are arranged on an upper right side of the first rotating electric machine 10 as viewed from the rotation axis direction (in a front view).

The second rotating electric machine 20 includes a stator core 22 and a multi-phase coil 23 attached to the stator core 22, and a coil end 23e of the multi-phase coil 23 protrudes from one end surface 22a of the stator core 22 so as to face the case cover 40. The coil 23 includes the U-phase coil, the V-phase coil, and the W-phase coil, and the coil end 23e is provided with a second neutral point bus bar 25 for connecting the U-phase coil, the V-phase coil, and the W-phase coil as a second power distribution member 6 so as to face the case cover 40. In addition, in a vicinity of the second neutral point bus bar 25, a second U-phase connection bus bar 26U for connecting the U-phase coils, a second V-phase connection bus bar 26V for connecting the V-phase coils, and a second NV-phase connection bus bar 26W for connecting the W-phase coils are also provided similarly as the second power distribution member 6. These second power distribution members 6 are arranged on an upper side of the second rotating electric machine 20 as viewed from the rotation axis direction (in a front view).

The power control unit 2 controls the first rotating electric machine 10 and the second rotating electric machine 20. A first lead-out conductor 13t led out from the coil 13 of the first rotating electric machine 10 and a second lead-out conductor 23t led out from the coil 23 of the second rotating electric machine 20 are connected to the power control unit 2 via a bus bar (not shown).

The first rotating electric machine 10 is, for example, a driving motor, and the second rotating electric machine 20 is, for example, a generator. Incidentally, the first rotating electric machine 10 may be a generator, and the second rotating electric machine 20 may be a driving motor.

As shown in FIGS. 1 and 2, the case cover 40 includes a first bulging portion 41 facing the coil end 13e of the first rotating electric machine 10, a second bulging portion 42 formed on the first bulging portion 41 and facing the first power distribution member 5 of the first rotating electric machine 10, a third bulging portion 43 facing the coil end 23e of the second rotating electric machine 20, and a fourth bulging portion 44 formed on the third bulging portion 43 and facing the second power distribution member 6 of the second rotating electric machine 20. As viewed from the rotation axis direction (in a front view), the first bulging portion 41 and the third bulging portion 43 each have a circular shape, and the second bulging portion 42 and the fourth bulging portion 44 each have a substantially crescent shape. Regarding a height relationship of the first bulging portion 41 to the fourth bulging portion 44, the second bulging portion 42 is the highest, and the first bulging portion 41, the fourth bulging portion 44, and the third bulging portion 43 are lower in height in this order. That is, the third bulging portion 43 is positioned closer to a case main body 31 side than the first bulging portion 41.

As described above, a portion of the first rotating electric machine 10 facing the coil end 13e is bulged from a surface of the case cover 40 to form the first bulging portion 41, and a portion of the second rotating electric machine 20 facing the coil end 23e is bulged from the surface of the case cover 40 to form the third bulging portion 43, so that an axial dimension of the case 30 can be reduced as compared with a case where the case cover 40 is made longer as a whole.

Further, when only a portion of the first rotating electric machine 10 at which the first power distribution member 5 is arranged is bulged from the first bulging portion 41 to from the second bulging portion 42, the axial dimension of the case 30 can be reduced as compared with a case where the entire first bulging portion 41 is bulged. Similarly, when only a portion of the second rotating electric machine 20 at which the second power distribution member 6 is arranged is bulged from the third bulging portion 43 to form the fourth bulging portion 44, the axial dimension of the case 30 can be reduced as compared with a case where the entire third bulging portion 43 is bulged.

A first wiring 51 and a second wiring 52 are arranged outside the case cover 40. As shown in FIG. 3, the first wiring 51 is connected to a first resolver 17 provided on the first rotating electric machine 10, and is drawn out to the outside from the inside of the case cover 40 through a through hole 41a provided in the first bulging portion 41. The second wiring 52 is connected to a second resolver 27 provided on the second rotating electric machine 20, and is drawn out to the outside from the inside of the case cover 40 through a through hole 43a provided in the third bulging portion 43. The first wiring 51 and the second wiring 52 are not limited to the wiring connected to the resolver, but may be a wiring connected to a temperature sensor, or may be a wiring arranged in another sensor device.

The first wiring 51 is drawn out from the first bulging portion 41 on which the second bulging portion 42 is not provided, and is routed on the surface of the case cover 40 so as to pass over the third bulging portion 43. The second wiring 52 is drawn out from the third bulging portion 43 on which the fourth bulging portion 44 is not provided, and is routed on the surface of the case cover 40 so as to pass over the third bulging portion 43. That is, at least a part of the first wiring 51 and the second wiring 52 is arranged along the surface of the third bulging portion 43. In this way, at least a part of the first wiring 51 and the second wiring 52 is arranged along the surface of the third bulging portion 43 positioned closer to the case main body 31 side than the first bulging portion 41, so that overhang of the first wiring 51 and the second wiring 52 can be suppressed, and a dimension of the rotating electric machine unit 1 can be reduced.

The first wiring 51 and the second wiring 52 are preferably positioned closer to the case main body 31 side than a surface of the second bulging portion 42. With this configuration, the first wiring 51 and the second wiring 52 can be prevented from overhanging further to the outside the second bulging portion 42 that is the largest bulging portion.

The first wiring 51 and the second wiring 52 do not overlap the second bulging portion 42 and the fourth bulging portion 44 as viewed from the rotation axis direction. That is, the first wiring 51 and the second wiring 52 are not arranged at the second bulging portion 42 that further bulges from the first bulging portion 41 and the fourth bulging portion 44 that further bulges from the third bulging portion 43. With this configuration, it is possible to more effectively suppress the overhang of the first wiring 51 and the second wiring 52.

The present invention is not limited to the embodiment described above, and modifications, improvements, or the like can be made as appropriate.

For example, although in the present embodiment, the power control unit 2 is exemplified as the mechanical and electric integrated rotating electric machine arranged at the upper portion of the rotating electric machine unit 1, a positional relationship between the rotating electric machine unit 1 and the power control unit 2 can be set optionally.

In the embodiment described above, the mechanical and electric integrated rotating electric machine unit is exemplified as the rotating electric machine unit 1, but the present invention is not limited thereto, and the rotating electric machine unit 1 may be a rotating electric machine unit that is separate from the power control unit 2 and is connected to the power control unit 2 via a three-phase wire, or may be a rotating electric machine unit integrated with a transmission or an engine.

In the above example, the rotating shaft 11 of the first rotating electric machine 10 and the rotating shaft 21 of the second rotating electric machine 20 are arranged to be offset in the front-rear direction and the up-down direction, but the rotating shaft 11 of the first rotating electric machine 10 and the rotating shaft 21 of the second rotating electric machine 20 may be arranged to be offset in only one of the front-rear direction and the up-down direction.

Further, at least the following matters are described in the present specification. Although the corresponding constituent elements or the like in the above-described embodiments are shown in parentheses, the present invention is not limited thereto.

(1) A rotating electric machine unit (rotating electric machine unit 1) including:
  a first rotating electric machine (first rotating electric machine 10);
  a second rotating electric machine (second rotating electric machine 20) including a rotating shaft (rotating shaft 21) that is parallel to a rotating shaft (rotating shaft 11) of the first rotating electric machine and is offset from the rotating shaft of the first rotating electric machine as viewed from a rotation axis direction; and
  a case (case 30) including a case main body (case main body 31) having a bottomed cylindrical shape that accommodates the first rotating electric machine and the second rotating electric machine, and a case cover (case cover 40) that seals an opening portion (opening portion 31a) of the case main body formed on one side in the rotation axis direction,
  wherein the first rotating electric machine and the second rotating electric machine each include
    a stator core (stator core 12, stator core 22),
    a multi-phase coil (multi-phase coil 13, multi-phase coil 23) attached to the stator core, and
    a power distribution member (first power distribution member 5, second power distribution member 6) arranged at a coil end (coil end 13e, coil end 23e) of the multi-phase coil so as to face the case cover, and connecting the multi-phase coil,
  wherein the case cover includes
    a first bulging portion (first bulging portion 41) facing the coil end of the first rotating electric machine, and
    a third bulging portion (third bulging portion 43) facing the coil end of the second rotating electric machine,
  wherein the third bulging portion is positioned closer to a case main body side than the first bulging portion, and
  wherein at least a part of a wiring (first wiring 51) connected to the first rotating electric machine is arranged along a surface of the third bulging portion.

According to (1), at least a part of the wiring connected to the first rotating electric machine is arranged along the surface of the third bulging portion positioned closer to the case main body side than the first bulging portion, so that overhang of the wiring can be suppressed. Therefore, a dimension of the rotating electric machine unit can be reduced.

(2) In the rotating electric machine unit according to (1), the case cover includes
  a second bulging portion (second bulging portion 42) formed on the first bulging portion and facing the power distribution member of the first rotating electric machine, and
  a fourth bulging portion (fourth bulging portion 44) formed on the third bulging portion and facing the power distribution member of the second rotating electric machine.

According to (2), only a portion of the first rotating electric machine at which the power distribution member is arranged is bulged from the first bulging portion to form the second bulging portion, so that the case can be reduced in a size as compared with a case where the entire first bulging portion is bulged. Similarly, only a portion of the second rotating electric machine at which the power distribution member is arranged is bulged from the third bulging portion to form the fourth bulging portion, so that the case can be reduced in the size as compared with a case where the entire third bulging portion is bulged.

(3) In the rotating electric machine unit according to (2), the wiring does not overlap the second bulging portion and the fourth bulging portion as viewed from the rotation axis direction.

According to (3), since the wiring is not arranged at the second bulging portion that further bulges from the first bulging portion and the fourth bulging portion that further bulges from the third bulging portion, the overhang of the wiring can be further suppressed.

(4) in the rotating electric machine unit according to (2) or (3),
  a wiring (second wiring 52) connected to the second rotating electric machine is arranged along the surface of the third bulging portion, and does not overlap the fourth bulging portion as viewed from the rotation axis direction.

According to (4), since the wiring connected to the second rotating electric machine is also arranged along the surface of the third bulging portion and does not overlap the fourth bulging portion as viewed from the rotation axis direction, the overhang of the wiring can be further suppressed.

The invention claimed is:

1. A rotating electric machine unit comprising:
  a first rotating electric machine;
  a second rotating electric machine including a rotating shaft that is parallel to a rotating shaft of the first rotating electric machine and is offset from the rotating shaft of the first rotating electric machine as viewed from a rotation axis direction; and
  a case including a case main body having a bottomed cylindrical shape that accommodates the first rotating electric machine and the second rotating electric machine, and a case cover that seals an opening portion of the case main body formed on one side in the rotation axis direction,
  wherein the first rotating electric machine and the second rotating electric machine each includes
    a stator core,
    a multi-phase coil attached to the stator core, and
    a power distribution member arranged at a coil end of the multi-phase coil so as to face the case cover, and connecting the multi-phase coil,
  wherein the case cover includes
    a first bulging portion facing the coil end of the first rotating electric machine, and a third bulging portion facing the coil end of the second rotating electric machine, wherein the third bulging portion is positioned closer to a case main body side than the first bulging portion, and wherein at least a part of a wiring connected to the first rotating electric machine is arranged along a surface of the third bulging portion.

2. The rotating electric machine unit according to claim 1, wherein the case cover includes a second bulging portion formed on the first bulging portion and facing the power distribution member of the first rotating electric machine, and a fourth bulging portion formed on the third bulging portion and facing the power distribution member of the second rotating electric machine.

3. The rotating electric machine unit according to claim 2, wherein the wiring does not overlap the second bulging portion and the fourth bulging portion as viewed from the rotation axis direction.

4. The rotating electric machine unit according to claim 2, wherein a wiring connected to the second rotating electric machine is arranged along the surface of the third bulging portion, and does not overlap the fourth bulging portion as viewed from the rotation axis direction.

* * * * *